Oct. 15, 1940.    O. W. PINEO    2,218,357
SPECTROPHOTOMETER AND SPECTROPHOTOMETRIC ANALYSIS AND PREDICTION
Filed March 24, 1939    7 Sheets-Sheet 1

Fig. I.

INVENTOR.
ORRIN WESTON PINEO,
BY
ATTORNEY.

Oct. 15, 1940.  O. W. PINEO  2,218,357
SPECTROPHOTOMETER AND SPECTROPHOTOMETRIC ANALYSIS AND PREDICTION
Filed March 24, 1939  7 Sheets-Sheet 2

INVENTOR.
ORRIN WESTON PINEO,
BY
ATTORNEY.

Oct. 15, 1940.  O. W. PINEO  2,218,357
SPECTROPHOTOMETER AND SPECTROPHOTOMETRIC ANALYSIS AND PREDICTION
Filed March 24, 1939  7 Sheets-Sheet 4

INVENTOR.
ORRIN WESTON PINEO,
BY Robert Ames Norton
ATTORNEY.

Oct. 15, 1940.   O. W. PINEO   2,218,357

SPECTROPHOTOMETER AND SPECTROPHOTOMETRIC ANALYSIS AND PREDICTION

Filed March 24, 1939   7 Sheets-Sheet 5

INVENTOR.
ORRIN WESTON PINEO,
BY Robert Ames Norton
ATTORNEY.

Patented Oct. 15, 1940

2,218,357

UNITED STATES PATENT OFFICE 2,218,357

SPECTROPHOTOMETER AND SPECTROPHOTOMETRIC ANALYSIS AND PREDICTION

Orrin Weston Pineo, Milo, Maine, assignor, by mesne assignments, to American Cyanamid Company, New York, N. Y., a corporation of Maine Application March 24, 1939, Serial No. 263,981

8 Claims. (Cl. 234—1.5)

This invention relates to spectrophotometers and spectrophotometric analysis and prediction, and more especially to spectrophotometers of the flickering beam type.

A number of spectrophotometers have been designed using flickering beams for measuring reflectance or transmission of standards and samples. Such flickering beam photometers usually incorporated a polarizing element such as a Nicol or Rochon prism as a photometering element through which the light of the flickering beam passes. An example of such a photometer is the one described in my prior Patent No. 2,107,836 dated February 8, 1938. Photometering is effected by rotating the polarizing element. However, the angle $\alpha$ through which the photometering prism has to be turned to compensate for a given unbalance of reflection or transmission between sample and standard at a given wavelength bears no linear relation to the ratio of the reflection or transmission of sample and standard.

It has been proposed to read a pointer linearly driven from the photometering element. If such a pointer were to be associated with a recording surface so as to draw a curve, readings thus obtained would not be directly translatable into ratio of reflection or transmission, because the ratio varies as the square of the tangent of the angle $\alpha$ through which the photometering element is turned to effect balance.

In my prior patent above referred to, I have described a method of driving an indicating or recording element in which the disadvantages inherent in the spectrophotometers of the type where an indicating or recording element is linearly driven from the photometering element are avoided by interposing a drive linkage between the photometering element and the indicating device, whether visual or recording, which linkage includes a drive of varying ratio, the ratio variation being such that the motion of the indicating device is proportional to the square of the tangent of the angle $\alpha$, i. e., to $\tan^2\alpha$. As a result, indications are obtained or records are made which are proportional to the reflection or transmission ratio. With the above described drive, therefore, it is not necessary to calculate from visual or written indications of the spectrophotometer to obtain the correct readings. Thus, for example, with the recording spectrophotometer described in my patent above referred to, having a linkage between photometering element and recording device containing a variable ratio drive varying in accordance with the tangent squared function referred to above, or a linear multiple thereof, a curve will be drawn, the ordinates of which correspond directly to reflection or transmission ratio and actual figures can be taken from such a curve if it is drawn on ordinary coordinate paper of suitable scale.

In my copending application, Serial No. 158,821 filed August 12, 1937, now Patent No. 2,176,013, dated October 10, 1939, of which the present application is in part a continuation, I have described and claimed a recording spectrophotometer having a drive of varying ratio for transmission measurements such that the recording element draws curves of transmission samples which are invariant in shape with changes in concentration of the coloring matter and which accordingly, by their shape, exhibit the specific absorbing power of the color constituents of the sample medium.

Transmission measurements involve a set of physical laws which permit of a ready and completely determinate mathematical analysis because the transparent colored media in general obey Beer's law. It was thus possible in my copending application to discover a formula which would relate movement of the photometering element of the recording spectrophotometer and movement of the recording element in such a manner that curves of shape invariant with concentration are drawn.

The measurement of color by reflection, that is to say, the measurement of the reflectance of colored materials or surfaces, is not capable of as simple analysis or capable of a unique relationship because of the fact that the nature of the colored medium, the reflectance of which is being measured, is a factor entering into the problem. If we take a colored medium which is transparent, light passes entirely through the thickness of the medium except for the proportion of light of different wavelengths which is absorbed. In other words, all of the light paths passing through the medium are of substantially the same length and Beer's law applies. As is set out in my copending application above referred to, Beer's law may be written $t=e^{-ql}$ where symbol $t$ is the transmission, $e$ is the base of the natural series of logarithms, $q$ is the absorbing power of the medium and $l$ is its thickness or the length of the light-path passing through it. For a single color, the specific absorbing property is a function of wave length, $k_1(\lambda)$. The absorbing power $q$ is the product of the specific absorbing property multiplied by the concentration $c^l$ so that $t=e^{-k_1(\lambda)c_1l}$. In the case of reflectance measurements, light striking a colored surface is not reflected uniformly for all surfaces. Some of the light is reflected from the surface itself. Another portion of the light penetrates relatively short distances into the material and is reflected. Other portions of light penetrate more deeply. In other words, the light is broken up into a large number of paths of different lengths so that while Beer's law may be applicable to any single path, it cannot be applied to the sum of the paths because they are not uniform in length and because the relative proportions of the light having shorter or longer paths will vary with different media, depending on the diffusing power of the medium and on its physical arrangement (whether homogeneous or in thin layers), and the like.

In order to apply Beer's law to the problems presented by reflection from colored media, it is necessary to substitute for the simple expression a sum from zero to infinity of all lengths of paths, to each of which Beer's law applied. This is the sum of the products of the attenuation according to Beer's law developed in my copending application, multiplied by a probability function which sets forth the relative fractions of the total incident light which enter the measurement by traversing paths of different length. This probability function is, however, not subject to a single valued solution because the nature of the function will vary with the characteristics of the medium and is, in fact, a fundamental property of the medium itself.

Mathematically, it is possible to express the problem in the following equation:

I. $$b = \int_0^\infty e^{-ql} P(l) dl$$

where $b$ is the measurement of the proportion of light reflected at any wavelength and $l$ is the length of each individual light path. It is apparent that the integrand is the product of two functions. The first is a simple exponential attenuation, according to Beer's law, which takes into consideration the absorbing power of the medium. The second is a probability function which expresses the relative percentage of the incident energy travelling along paths of different lengths, and thus takes into consideration the diffusing power of the medium.

Assuming a material of perfect and uniform diffusing properties, the simplest assumption to be made with respect to the probability function is that the frequency of the paths would be an exponential function of their length; in other words, that the probability function would have the form:

II. $$P(l) = \frac{1}{L} e^{-l/L}$$

Here $L$ is a constant proportional to the size of the microscopic structural inhomogeneities responsible for the light diffusion, thus defining the diffusing power of the medium. On a plot of $P(l)$ against $l$, an increase in $L$ gives a corresponding extension of the plot along the $l$ axis and a corresponding compression along the $P(l)$ axis whereby the area under the curve remains constant. This is the change to be expected in $P(l)$ when the scale of the medium structure is changed. In usual cases where the medium is extremely fine—of the order of light wavelengths—the change in $P(l)$ may be less simple. It is further to be noted on such a plot, that the path length $l=L$ divides the area under the curve roughly into halves, and therefore $L$ is a sort of median length as its notation implies. When such a simple probability function is placed in the integral, it follows that III. $$\log qL = \log \frac{1-b}{b}$$

When a recording spectrophotometer was built in which a drive of varying ratio was interposed between the photometering element and the recording element so that the recording element moved in proportion to $$\log \frac{1-b}{b}$$

the machine drew curves whose shapes were substantially invariant with changes in the concentration of a sole color constituent. Such a machine with actual diffusing media gives results which are sufficiently accurate for the majority of uses such as analyzing sample curves in terms of color content. The curve shape, however, is not absolutely invariant and furthermore, although the curves are displaced according to a logarithmic scale of concentration and can be so analyzed and predicted, the displacement is at a slower rate than predicted by Equation III and the logarithmic scale must be shortened empirically to around 0.7 modulus.

If it is attempted to explain these experimental results, it is seen that long paths must be more effective in the process than assumed in Equation II. Therefore, it was thought that in practical media light might have to penetrate a definite distance before any of it could be diffused enough to turn it backward. In other words, $P(l)$ should not be largest for $l=0$ as assumed, but should rise rapidly to a maximum at some small but definite length greater than zero. The simple form IV. $$P(l) = \frac{1}{L^n \overline{|(n)}} l^{n-1} e^{-l/L}$$

has $l^{n-1}$ multiplied in to make the function small, when $l$ is small, in degree determined by the amount by which $n$ exceeds unity (for which value Equation II is the particular case). Substituting into Equation I leads to V. $$\log qL = \log \frac{1-b^{1/n}}{b^{1/n}}$$

An experimental test showed that the value of $n$, which would result in the correct prediction of the modulus of the logarithmic scale of curve displacement with concentration, was less than unity (about 0.65) and that for this value the curves for a sole color constituent changed shape more than when the simpler assumption was made. Consequently this effect of imperfect diffusion in the medium was not capable of explaining in this form the need for shortening the logarithmic concentration scale, because a negative effect was indicated.

A further analysis of the underlying physical factors led to a better approximation for $P(l)$ than the simple exponential function, by using the first order Bessel function with imaginary argument:

VI. $$P(l) = \frac{1}{l} e^{-l/L} I_1(l/L)$$

When this form is substituted in Equation I, it follows that

VII. $$\log qL = \log \frac{(1-b)^2}{2b}$$

When a drive of varying ratio in accordance with the last formula was substituted in the recording spectrophotometer, curves for good diffusing media showed practically perfect invariance of shape with the concentration of a sole color constituent within the experimental uncertainty of the measurements, and their displacement with concentration was according to a logarithmic scale of the predicted modulus.

It is of interest to note that the probability function IV using the Bessel function shows an increase of long paths over that obtained with the simple exponential function II, but is otherwise very similar. This explains the experimental results described above.

The form of Equation VI may be generalized to describe the less ideal diffusion in practical media, as contemplated above, by replacing the ones with a generalized parameter $n$ which has the value unity for an ideal medium. This leads to VIII. $\quad P(l) = \frac{n}{l} e^{-l/L} I_n(l/L)$ and IX. $\quad \log qL = \log \frac{(1-b^{1/n})^2}{2b^{1/n}}$ The greater penetration of the light paths when $n>1$ can be accounted for to the first approximation by assuming a correspondingly greater L. This explains why Equation VII actually works so well for practical media such as paints and fabrics. Of course, the equivalence between change in $n$ and change in L is only approximate. Consequently, for the most accurate analysis and prediction, the variable ratio drive in the spectrophotometer plotting mechanism is provided with an adjustable member which introduces any desired value of $n$ into the transformation strictly according to Equation IX. This will accommodate for materials having different degrees of departure from ideal diffusing characteristics. The use of a varying ratio drive in two portions with adjusting means capable of introducing the values of the parameter $n$ may be considered, therefore, as the most accurate embodiment of invention. In practice it is sufficient to provide for values of $n$ between 1 and 2. However, such drives are more complex and more expensive. For ordinary measurements in which the extreme of precision is not essential, a varying ratio drive of fixed ratio variation according to Equation V with a suitable fixed value of $n$ which may, if desired, be unity may be used and produces a machine which gives high precision with materials of ideal diffusing characteristics and departs so little for all ordinary media as to be practically useful. The question of whether maximum precision for all different media is to be obtained, or maximum economy in machine construction and speed of measurement, will vary with the operating conditions under which the machine is to be used and will determine whether split drives of varying ratio with their greater expense are to be preferred over the simpler fixed ratio variation drives.

In order to read percentages of reflectance from a curve, it is necessary to draw the curve on a non-uniformly graduated paper which corresponds to the ratio variation formula. Then the curve will give the percentage reflectance and all curves of a sole coloring matter in varying concentrations will give curves of identical shape but displaced on the paper by an amount proportional to the logarithm of the concentration. This is due to the fact that the reflectance is a function of the product $qL$ of the specific absorbing power of the color, its concentration, and the diffusing power of the medium. Since, however, the ratio variation of the machine draws a curve of $\log qL$, the measurement may be considered as of $\log k(\lambda) + \log c + \log L$. Variations in concentration, therefore, will serve to add or subtract, and will result in displacing the curve up or down on the recording sheet an amount uniform with wavelength. This does not change the shape of the curve, and permits the analysis of samples where the concentration is not known.

The fundamental ratio variation formulae given above apply to any flickering beam spectrophotometer. In the case of polarization spectrophotometers, such as those described in my prior Patent No. 2,107,836 above referred to, photometering is effected by rotating a polarizing prism and the reflectance equals the square of the tangent of $\alpha$, the angle through which the photometering prism is turned. Accordingly, with such a spectrophotometer, $\tan^2\alpha$ must be substituted for $b$ in the formula defining the ratio variation of the drive and this becomes for the general case:

X. $\log qL = \log (\cot^{2/n}\alpha + \tan^{2/n}\alpha - 2) - \log 2$

The above formulae, and the machines with drives of varying ratio corresponding thereto, will draw curves of invarient shape with concentration as far as the body color is concerned; that is to say, as far as concerns reflected light which has passed through at least some thickness of the colored medium. Some of the incident light, however, does not penetrate the colored medium at all but is specularly reflected. It is not subjected to selective absorption by the color and therefore is not taken into consideration in the analysis. It may, however, be cancelled out partly or entirely by simple means which are included as features of a more specific modification of the invention. The easiest way with certain media to eliminate surface reflectance or to minimize it until the factor becomes negligible, is to use a photometer in which the specularly reflected light from the surface of the sample does not contribute to the measurement. This may be effected by the use of a sample with a concave surface so that the specularly reflected light passes back through the window through which the flickering beam enters or otherwise is concentrated at a point where it can be eliminated from the measurement. This method, of course, is applicable only to media which can be made to assume such a surface, e. g. coating compositions which can be coated on a suitable holder of transparent material, such as a zero power lens, the incident rays passing through the lens and then encountering the concave surface of the medium, specularly reflected rays passing back through the lens along the same path. Plastics which can be ground or molded to a suitable surface do not necessarily require a transparent support. This method of cancelling out surface reflectance is not claimed in the present application but forms the subject matter of my copending application, Serial No. 228,893 filed September 8, 1938. Another and preferred method is disclosed in my application, Serial No. 228,736 filed September 7, 1938, now Patent No. 2,194,910, dated March 26, 1940.

Figure 6:
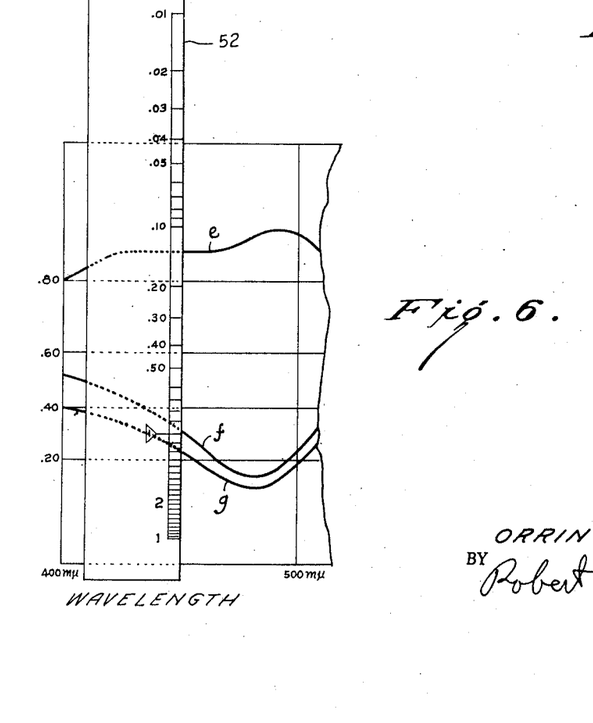
Fig. 6 illustrates the superposition of a suitable scale on Fig. 5 to predict the result of such an addition, the plot being shown fragmentarily.

It must be understood that most reflecting materials are not composed entirely of the colored particles (molecules or aggregates), which it is desired to measure. In most cases, the colored particles are applied to or mixed with other material which may be more or less white or have a definite color. In each case, the light absorption of the substrate at each wavelength is included in $q$. For example, a typical white medium, such as zinc oxide, does show some light absorption throughout the spectrum, and a somewhat greater absorption of the shorter wavelengths in the blue and violet region (which is merely saying in other words that the white zinc oxide has a faint yellowish tinge). The presence of absorption by the zinc oxide prevents the complete invarience of shape of the curve with concentration of added color because in every case the reflectance at any wavelength involves two factors, namely the absorption due to the added color, and that due to the medium itself. Since the medium does not change with varying concentration of added color, this effect will modify to some extent the shape of the curves for different concentrations. However, when using the drive of varying ratio which plots log $qL$, the effect of the absorption of the medium itself is an additive one, though requiring a special scale to effect numerical addition because of the logarithmic scale of $q$. The effect of addition of two curves will be discussed in greater detail in conjunction with a dye mixture illustrated in Figure 6.

In the drawings.

Fig. 3 is a series of curves for different concentrations of the same dye drawn by an instrument having a simple tangent squared cam as described in my prior patent above referred to;

Figure 1:
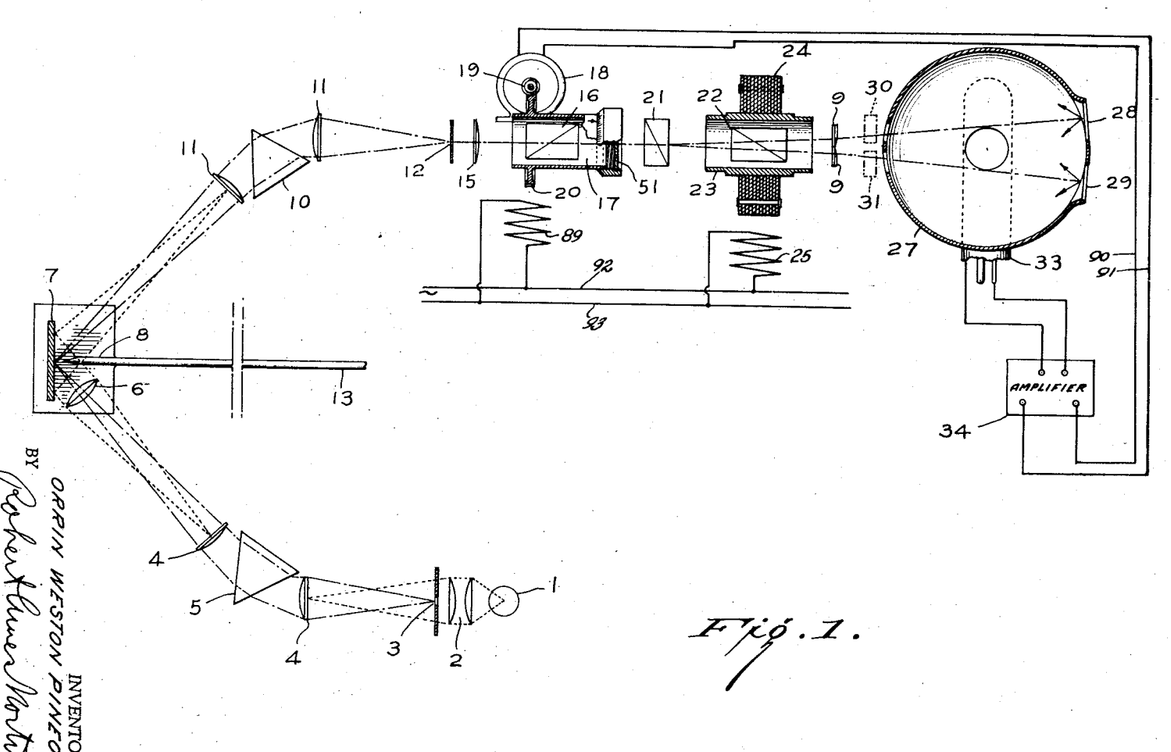
Fig. 1 is a diagrammatic illustration of a flickering beam type of spectrophotometer according to my prior Patent No. 2,107,836 dated February 8, 1938.

In Fig. 1, the monochromator consists of incondescent lamp 1, preferably of the low voltage compact filament type, a pair of condensing lenses 2, a variable slit 3, collimating lenses 4, first prism 5, lens 6, mirror 7, knife edge 8, second prism 10, collimating lenses 11 and exit slit 12. The mirror and knife edge may be reciprocated by means of the rod 13 moving the slit defined by the knife edge through the spectrum so that the light passing slit 12 can be caused to traverse the visible spectrum.

The light leaving the slit 12 of the monochromator is collected by lens 15 into the photometer prism 16 which is of a conventional Nicol or Rochon type. The prism is mounted in the hollow shaft 17 which is rotated through the worm 19 and ring gear 20 by the motor 18 in a direction depending on the phase of the A. C. current energizing the armature as compared to the A. C. current in the field 89. The beam then passes through a bi-refringent plate 51 of a thickness sufficient to produce a retardation of about 2¼ $\lambda$ in the middle of the visible spectrum. The plate rotates with the hollow shaft 7 but is adjustable thereon. The plate is angularly adjusted to give retardation such that the light leaving the prism 16 is elliptically polarized. The relative size of the minor axis of the ellipse is such that at the setting of prism 16 corresponding to zero reflectance of the sample 28, there is sufficient light in the beam illuminating the standard to balance out surface reflection from the sample. The amount of surface reflection varies with wave length but a plate having the thickness referred to above produces retardation which also varies with wave length in such a way as to correct the surface reflection throughout the visible spectrum to a usable degree of accuracy.

The elliptically polarized beam leaves the plate 51 and passes through a Wollaston prism 21 where it is separated into two beams plane polarized at right angles to each other and the two beams pass through a flicker prism 22 which is mounted in a hollow shaft 23 being the center of the rotor 24 of a synchronous motor, the field 25 of which is energized by 60 cycle alternating current which is also used to energize the field 89 of the motor 18. The beams after passing through the flicker prism and the decentered lenses 9 enter into the integrating sphere 27 and strike targets 28 and 29. Transmission cells 30 and 31 (shown in dotted lines) may be interposed in the two beams before they enter the integrating sphere.

In the wall of the integrating sphere is an aperture through which the integrated light from the sphere passes and impinges on a photocell 33. The current from the photocell is amplified at flicker frequency by a high gain vacuum tube amplifier 34 and the amplified current which is also at flicker frequency is then fed through the wires 90 and 91 to the armature of the motor 18 which rotates the photometer prism.

In operation, the movement of the carriage carrying the mirror 7 and the knife edge 8 causes the light from the monochromator to to traverse the spectrum. The photometer prism plane polarizes a beam defined by the shape of the slit 12 and this beam will vary slightly in intensity with the degree of polarization in the monochromator at different wave lengths. The plane of polarization of the beam leaving the photometer prism is, of course, determined by the position of the prism which in turn determines the relative brightness of the two polarized beams leaving the Wollaston prism. The flicker prism 22 rotates at 1800 R. P. M. in order to give a flicker frequency of 60 cycles per second since each beam passes through two cycles from maximum to minimum for every revolution of the flicker prism. The flickering beams encountering the two targets 28 and 29 are reflected in accordance with the reflecting characteristics of the target surfaces at the particular wave length of monochromatic light or if uniform targets are used and cells of material are inserted at 30 and 31 the beams will vary in accordance with the transmission characteristics at the particular wave length of the comparison cell and the cell to be measured. The paths of the light rays are indicated on the drawings by lines in the customary manner.

Any unbalance in total light reflected from the respective targets during a complete cycle will produce a total variation of light in the integrating sphere, the variation being at flicker frequency, that is to say, 60 cycles per second. This 60 cycle current, together with any stray fluctuations at other frequencies which may result from the characteristics of the targets, are then amplified by the high gain amplifier which should be capable of amplifying a voltage produced by the photocell in the grid circuit of the first amplified tube of the order of 10 micro volts so as to produce an output from the amplifier of the order of 10 watts. This amplified current which, of course, contains as one of its main components the 60 cycle flicker frequency is then fed into the armature of the motor 18. Since the field of the motor 18 receives pure 60 cycle A. C. through the power lines 92 and 93, the motor will respond substantially only to the 60 cycle flicker frequency; in other words, the motor may be considered as a very sharply selective device which responds only to the frequency in its field. The motor rotates and moves the photometer prism until the latter has varied the relative intensity of the two beams from the Wollaston prism by an amount exactly sufficient to compensate for the variation in the light reflected from each target at which time there is no fluctuation of light in the integrating sphere at flicker frequency and, therefore, there will be no amplified 60 cycle flicker frequency in the tube of the amplifier and hence the motor 18 will stop. The highly selective characteristic of the motor 18 is very important since stray effects make it impossible to produce in the photocell output circuit anything like a pure sinusoidal 60 cycle current. On the contrary, an oscillogram of the amplified photocell output shows the presence of an enormous number of stray frequencies. Because of the great selectivity of the motor 18, however, it is actuated only by the 60 cycle component and therefore gives a true response to beam unbalance. The direction in which the motor 18 rotates depends, of course, on the phase of the 60 cycle component in the amplifier output which reverses with the reversal of the relative intensity of the reflected light from the two beams. Thus, for example, if there is unbalance so that the light reflected from target 28 is greater than that from 29, the resulting 60 cycle component after being amplified will have one phase, as compared to the 60 cycle current flowing in the field windings of the motor, whereas if the opposite condition takes place, that is to say, if the reflected light beam from target 29 is greater than that from 28, the 60 cycle in the output will have exactly the reverse phase and, of course, will turn the motor 18 in the opposite direction. Before the photometer is put into operation initially, it is necessary to adjust the phase of the amplifier output so that the motor turns in the right direction and with maximum torque. This is done by adjusting the prism 22 with respect to the rotor 24, or by rotating the field 25. A reversal of leads, of course, will result in the motor turning the photometer prism away from balance instead of toward balance.

Figure 2:
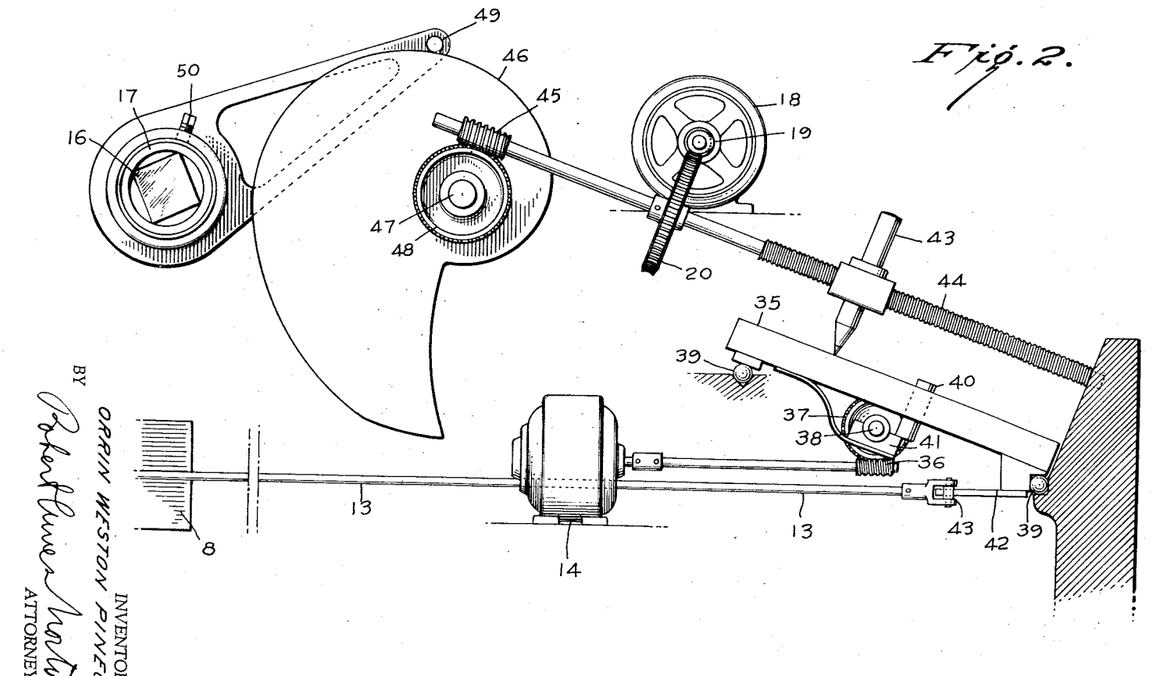
Fig. 2 is an elevation of a recording means connected to the spectrophotometer of Fig. 1 and incorporating a cam to provide the fixed varying-ratio drive of the present invention.

Fig. 2 shows in detail the recording means used in conjunction with the spectrophotometer of Fig. 1 to produce a continuous graph of reflection or transmission characteristics of a given sample at the various wave lengths throughout the spectrum. Like parts bear like numerals. A wave length traversing motor 14 drives a worm 36 which rotates a worm wheel 37 keyed on a screw threaded shaft 38, the rotation of which causes a table 35 to move along the shaft, the table is supported on suitable ball bearings 39 and is provided with a disengaging button 40 operating a spring held half-nut 41 which engages the screw thread on the shaft 38. One end of the table 35 carries a cam 42 which bears on a cam follower 43 on the end of the shaft 13 which shifts the monochromator mirror carriage to cause the monochromator light to traverse the spectrum. The profile of the cam 42 is chosen so that the movement of the shaft 13 will cause equal displacement of wave length in the monochromator light for equal movements of the table 35. Since the traversing of the monochromator is directly effected by movement of the table, the latter can be moved rapidly by pressing the button 40 and moving the table by hand. This permits a rapid return of the table when a graph has been drawn and makes it unnecessary to return the table slowly by operation of the motor 14. Of course, if desired, the motor 14 may drive both the table and the cam directly, in which case manual return is not possible. I prefer, however, to use the form of drive shown where the table is moved by the motor and the table, in turn, actuates the monochromator.

A stylus 43 is on the threaded shaft 44 which is driven by the photometer prism motor 18 through a worm 19 and worm gear 20. The shaft 44 also carries a worm gear 45 which drives a shaft 47 through a worm gear 48. On the shaft 47 is keyed the cam 46 and the cam, in turn, moves a crank arm 49, which moves the photometer prism 16 in its hollow shaft 17. The profile of the cam is so chosen that the movement of the stylus 43 is proportional to the desired function of square of the tangent of the angle through which the prism 16 is moved. The stylus 43 will therefore respond to the difference in total light from the samples in the two beams and, therefore, the recording means will draw a graph which shows the desired function of light transmission or reflection, as the case may be, of the sample at any wave length. In order to make fine adjustments so that the reflection from or transmission of the standard will correspond to 100% on the graph paper which is clamped to the table 35, it is some times necessary to make minute adjustments on the prism 16 and this may be done by means of the set screw 50 which permits shifting the hollow shaft 17 slightly in the crank arm 49. Such adjustment will be necessary only when the machine is first put into operation.

It is sometimes desirable to change the percentage transmission scale on the graph; thus, for example, it may be desirable to cause a greater movement of the stylus 43 for a given percentage change in reflection or transmission characteristic of the sample. This may be effected by changing the gear ratio between the shaft 44 and the shaft 47 or by using a shaft 44 with a different pitch of screw thread. In every case, the response of the stylus 43 will still be proportional to the same function of square of the tangent of the angle through which the prism 16 is turned, but this proportion may be multiplied by constant factors introduced by the gear ratio and screw pitch.

In operation, a sample to be tested for reflection forms one of the targets, for example 29, whereas target 28 is a standard white surface which may be obtained by smoking a magnesium carbonate block with magnesium oxide or in the case of fabrics, an undyed fabric may be used as the standard. The synchronous motor rotating the flicker prism 22 is then started and brought up to speed. The wave length traversing motor 14 is then started at one end of the spectrum. The unbalance between the reflected beams at the start is amplified and the motor 18 rotates until the photometer prism 16 has been turned by the cam through a sufficient angle to balance the beams. The amount of rotation will move the stylus down the paper to the ordinate corresponding to a certain percentage of reflection. As the monochromator slowly traverses the spectrum, the table 35 moves in step with it and at each wave length the motor 18 rotates in one or the other direction until the photometer prism has restored balance in the reflected beams. The stylus therefore draws a continuous curve or graph which is a true plot of the desired function of percentage reflection of the given sample corresponding to each wave length of the spectrum. If cam 46 causes the motion of the stylus to be in simple proportion to the square of the tangent of the angle through which photometric prism 16 is turned, the graph will plot percentage reflection on a uniform scale, as in my prior patent above referred to.

When it is desired to measure the transmission of a colored solution or transparent or translucent colored substance, instead of reflection, the two targets 28 and 29 are made uniform white targets and the cell containing water or other standard is inserted at 30 while a cell containing the solution or a piece of the transparent material is inserted at 31. The measurement of the light transmission at different wave lengths proceeds precisely as described above in connection with the recording of a curve defining the reflecting characteristics although, of course, the nature of the curve for a given coloring matter will naturally be different.

The flicker system shown in Fig. 1 is, of course, only by way of illustration and other flickering devices may be used such as, for example, a stationary prism with a rotating half wave plate, a Kerr cell, and the like, such types being described in my copending application Serial No. 158,821 filed August 12, 1937, now Patent No. 2,176,013, dated October 10, 1939. The present invention is, furthermore, not limited to any particular type of photometer.

Figure 3:
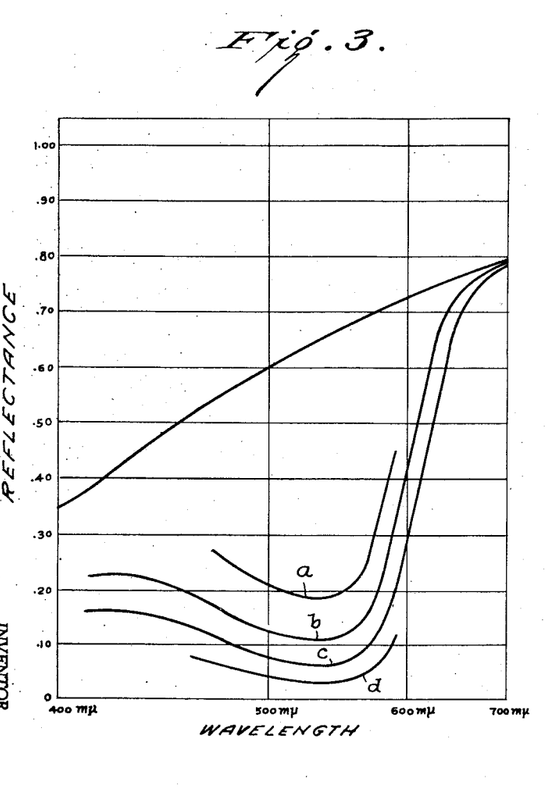
Figure 4:
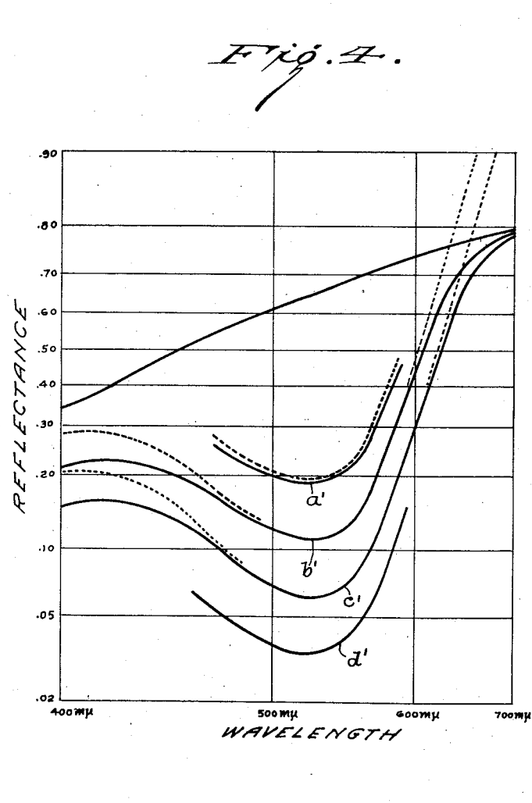
Fig. 4 is a series of curves for the same concentrations of the same dye as in Fig. 3 but drawn by an instrument in which the simple tangent squared cam is replaced by the cam of Fig. 2 to trace directly the curve of the absorbing power of the sample medium.

In Fig. 3, the curves for the various concentrations of the same dye in a thick diffusing sample are shown at $a$, $b$, $c$ and $d$. It will be noted that as the concentrations vary, the shape of the curve varies and unless the concentration is known, nothing very definite can be determined as to the nature of the dye itself from the examination of any particular curve. The curves of Fig. 3 are, of course, drawn by a recording spectrophotometer using the simple tangent squared cam of my prior patent. If this cam is replaced by one which gives directly for reflection measurement, the specific absorbing property defined above as $k$ of $\lambda$, the curves of the same concentrations of the same dye as in Fig. 3 now appear as $a'$, $b'$, $c'$ and $d'$ on Fig. 4. It will be noted that when the color of the substrate (top curve) is subtracted out as will be explained in connection with Fig. 8, the shape of the resultant (dashed) curves is invariant and they are merely displaced vertically by variations in concentration.

Figure 5:
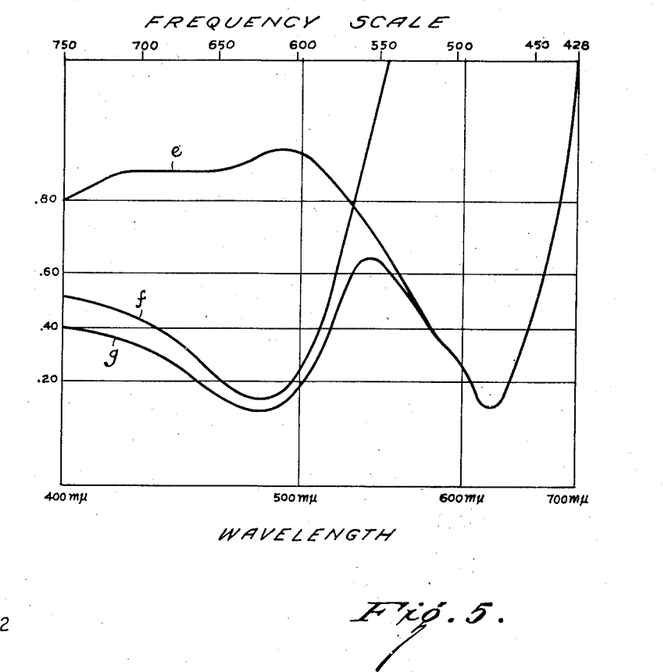
Fig. 5 shows two curves representing two different component dyes and a curve representing a mixture of the two components, all applied to a transmission scale.

On Fig. 5 are shown curves $e$ and $f$ which represent two different dye components. Curve $g$, on the same figure, shows the resultant of the mixture of these two components, all applied to a reflectance scale. When curves $e$ and $f$ are drawn in terms of absorbing power of the medium using the cam appropriate to any particular type of measurement on the medium, it is necessary only to add their values on a logarithmic scale which may be superimposed over the curves as shown at 52 in Fig. 6, in order to determine the compounded curve $g$. This follows from the definition of the medium absorbing power $q$ in Beer's law, and the further fact that log $qL$=log $q$+log $L$ is chosen to be plotted. The above method can, of course, be used with more than two components.

Figure 7:
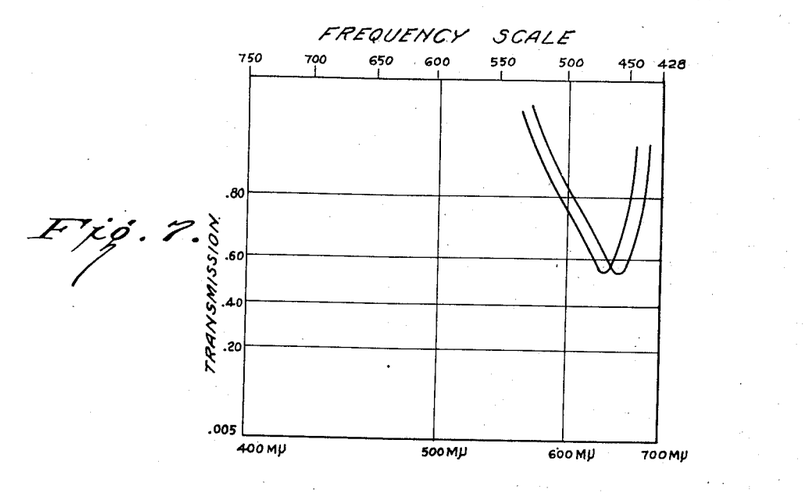
Fig. 7 illustrates the effect of chemical properties of the medium in displacing the curve horizontally.

Fig. 7 shows the effect of chemical properties of the media in displacing the curves horizontally.

Figure 8:
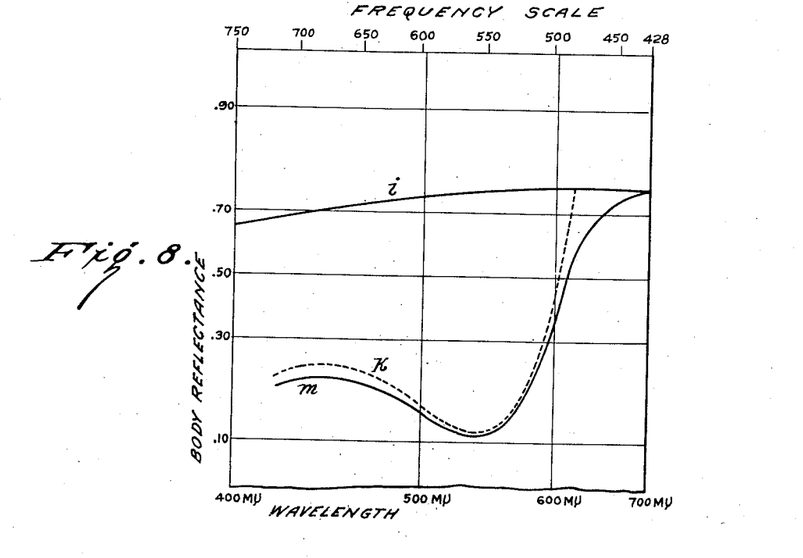
Fig. 8 is similar to Fig. 4 but it shows the result of using a variable ratio drive and coordinate paper based on the reflectance scale instead of the transmission scale of Fig. 4.

Fig. 8 shows the result of determining the curve $k$, representing the added dye, from the curve $l$ of the substrate alone (for example, a cotton fabric) and the curve $m$ of the compounded dyeing. The method follows directly from the above, except that here one subtracts, rather than adds, on the logarithmic scale.

The scale of Figs. 5 to 8 is a logarithmic scale defined by Equation VII. It will be noted that this is not a simple logarithmic scale as the right hand member of the equation represents the logarithm of a function and not a single variable. Nevertheless the scale is logarithmic. The abscissae represent equal frequency intervals and the ordinates correspond to the logarithms of the function $$\frac{(1-b)^2}{2b}$$

This accounts for the fact that the ordinates do not represent a scale which is the same as a simple logarithmic scale.

Figures 9, 10:
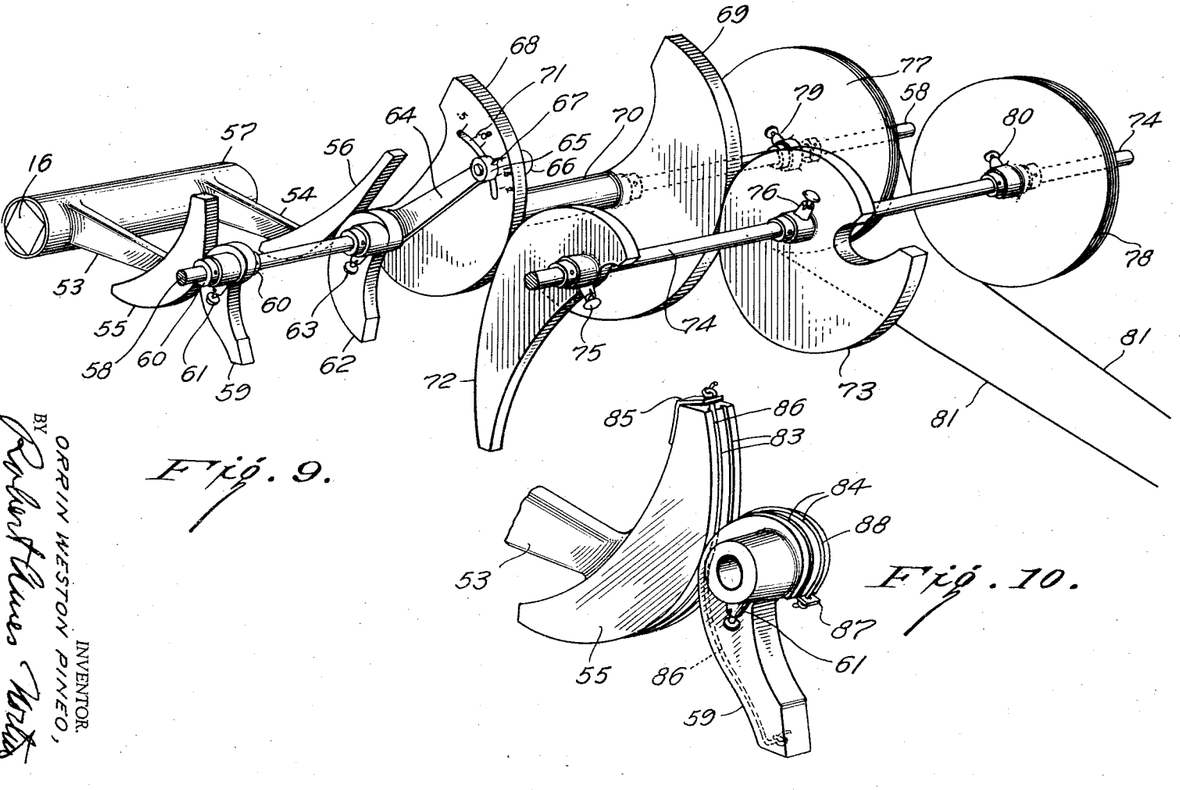
Fig. 9 is a schematic perspective view of a cam gear drive providing an adjustable varying ratio.
Fig. 10 is a detail of a construction of a pair of cam gears.

Figs. 9 and 10 illustrate a preferred construction of varying ratio drives employing cam gears. In Fig. 9 there are shown several sets of cam gears capable of giving plots on either ordinary linear coordinate paper (corresponding to the simple tangent squared function) or on special paper to show the medium absorbing power in transmission or reflection measurements. The spacing of the various cam gears on their shafts is exaggerated in order to show the elements clearly.

The prism 16 corresponds to the same element in Figs. 1 and 2 and the shaft 57 corresponds to the hollow shaft 17 of Figs. 1 and 2 but it is in the form of a casting with two arms 53 and 54 each of which in turn carries one member of a cam gear numbered 55 and 56, respectively. Cam 55 meshes with cam 59 which is mounted on shaft 58 between the collars 60 which prevent axial movement on the shaft. A pin 61 is provided on the hub of the cam 59 and can engage with a hole in the shaft 58 (not shown on the drawing). Thus, cam 59 can either turn freely on shaft 58 or can be locked to it in one position, but in one position only. In a similar manner, cam 62 meshes with cam 56 and is mounted on shaft 58 in the same manner as cam 59 being likewise provided with a pin 63 which will register with a hole in the shaft 58. Cam 62 is further provided with an arm 64 carrying a drilled end 65 provided with a clamping screw 66 and an index 67.

Two cams 68 and 69 are mounted on the shaft 58 being rigidly connected together by the sleeve 70. These two cams are not provided with any locking means direct to the shaft 58 but are merely prevented from axial movement thereon by collars. Cam 68 is provided with a curved slot 71 through which the clamping screw 66 extends and is provided with an enlarged head or shoulder on the back side of the cam (not shown) in accordance with the standard construction for clamping screws. It is thus possible to clamp cam 68 to the arm 64, which is integral with cam 62, in any one of a number of positions covered by the arc of the slot 71. A suitable non-linear scale is shown on cam 68 which, by cooperating with the index 67, permits accurate adjustment of the relative positions of cams 62 and 68 of shaft 58. Of course, any adjustment of the relative position of cams 62 and 68 will result in the same relative position of cams 62 and 69 because of the rigid connection between cams 68 and 69.

Cam 68 meshes with another cam 72 mounted on a shaft 74 in the same manner as cams 59 and 62 are mounted on shaft 58, namely, by means of collars which prevent axial movement and a locking pin 75 which can engage in a suitable hole (not shown) in shaft 74. Cam 73 is likewise mounted on shaft 74 in the same manner as cam 72 and can be locked to the shaft in one position only by the locking pin 76. This cam meshes with cam 69.

Figure 11:
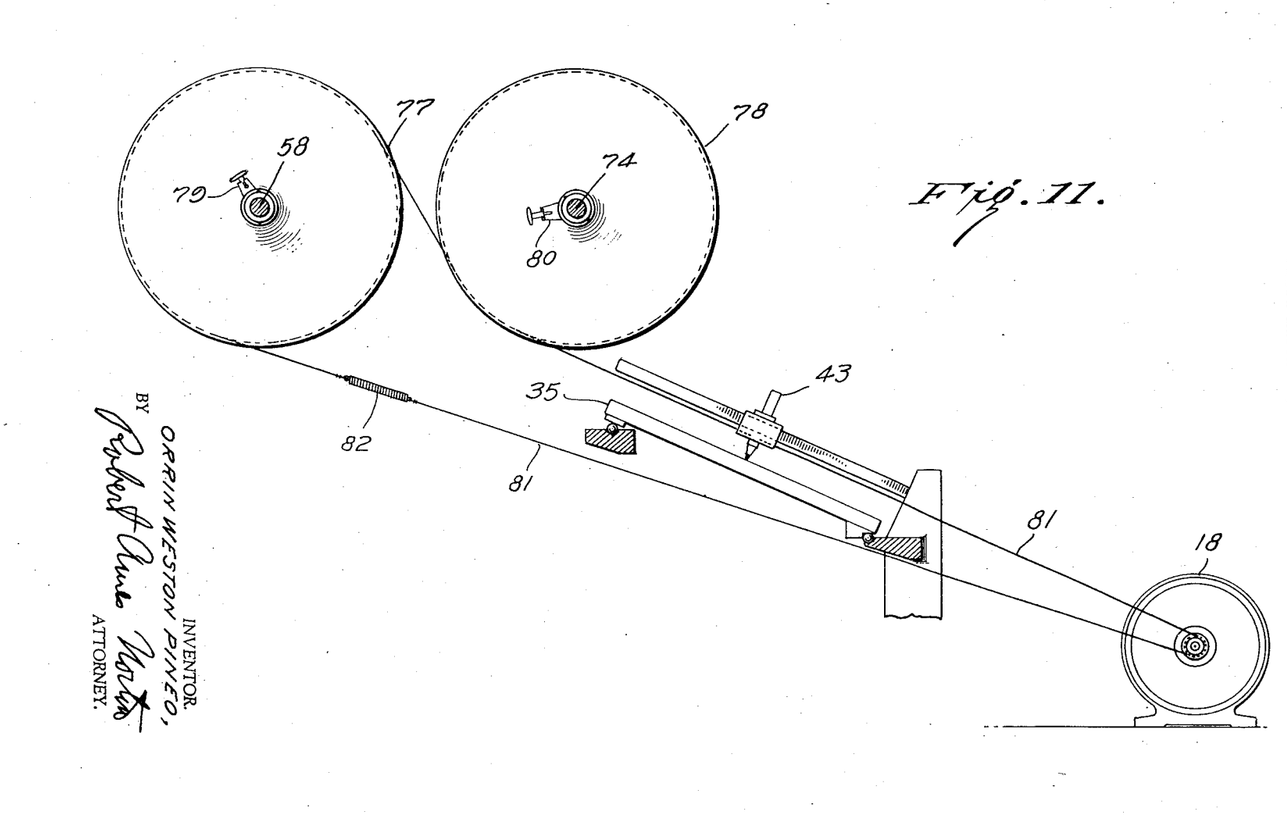
Fig. 11 is a schematic elevation of the recorder drive from the cam gears of Fig. 9.

Two pulleys 77 and 78 are mounted respectively at the end of shafts 58 and 74 and are in the same plane. They are held on their respective shafts in the same manner as are cams 59, 62, 72 and 73; that is to say, they cannot move axially and can be locked to their respective shafts in one position only by the locking pins 79 and 80, respectively. A cable 81 passes around the pulleys 77 and 78 in such a manner that either pulley will give a positive drive. This is preferably effected by locking the cable to each of the pulleys at a suitable point. The cable 81 is driven by a motor 18 and is clamped to a stylus 43 moving over the surface of a table 35, as shown in Fig. 11. The last three numbered elements correspond to the same numbered elements in Fig. 2.

In order to prevent slippage in cam gears, it is customary to provide positive drive means. This is shown in Fig. 10 which is an enlarged detail view of the cams 55 and 59. The cam 55 is provided with two parallel grooves 83 registering with two corresponding grooves 84 in the face of cam 59. A cable 86, tensioned by a leaf spring 85, runs from one end of the cam 55 to the opposite end of the cam 59 in the left-hand grooves of the two cams. Similarly, a cable 88, tensioned by a leaf spring 87, runs in the right-hand grooves of the two cams. The cams are thus held in positive, but rolling, contact and the cam gear operates without any slippage. The cables are not shown in Figure 9 which is purely schematic and designated to show the general arrangement of the gears. Of course, any other suitable form of cam gears may be used.

In operation, the table 35 is moved at right angles to the plane of Fig. 11 in accordance with the movement of the monochromatic light beam through the spectrum just as is shown in Fig. 2. The balance of the beams from sample and standard shown in Fig. 1 is effected by movement of the photometering prism 16. In the modification shown in Figs. 9 to 11, this is effected by rotation of the motor 18 which moves the cable 81, kept taut by the tensioning spring 82. This, in turn, rotates both the pulleys 77 and 78. If it is desired to draw a curve of reflectance or transmission percentage on ordinary coordinate paper using a drive having the simple tangent squared function, the pin 80 on the pulley 78 is moved to a position out of engagement with the shaft 74 so that the pulley 78 idles and the pin 79 is engaged in its locking hole in shaft 58, so that this shaft rotates with pulley 77. Pin 63 is disengaged and pin 61 is engaged into its locking hole so that cam 59 rotates with the shaft 58 and hence drives the hollow shaft 57 containing the photometering prism 16 through the cam 55 and arm 53. The gear ratio of the cam gear defined by the pair of cams 55 and 59 is so chosen that the rotation of the shaft 58 is in proportion to the square of the tangent of the angle through which hollow shaft 57 is rotated. Thus, the movement of the pen 43 which is clamped to the cable 81 is likewise in proportion to the square of the tangent of the angle through which photometering prism 16 is turned. Accordingly, the pen will trace a curve on ordinary coordinate paper which gives the transmission or reflectance ratio of sample and standard.

If it is desired to plot the logarithm of the absorbing power of a dye solution, this is effected by unlocking cam 59 from shaft 58 (by means of the pin 61) and locking cam 62 into its predetermined position on the shaft 58. Pulley 78 remains unlocked from shaft 74 as do cams 72 and 73. Movement of the cable 81 by the motor 18 rotates pulley 77, shaft 58 and cam 62, which latter drives shaft 57 through the cam gear formed by cams 56 and 62. The ratio of this cam gear corresponds to the log log $\cot^2 \alpha$ and accordingly, when using the proper log log coordinate paper, the pen 43 will plot log $ql$ which shows the absorbing power of the sample medium and has a shape invariant with concentration. This portion of the apparatus is not claimed in the present case but forms the subject matter of my earlier application which issued October 10, 1939 as Pat. No. 2,176,013.

When it is desired to plot similar curves of log $qL$ for reflectance samples, pulley 77 is unlocked from shaft 58, pulley 78 is locked to shaft 74 in its predetermined position, and cam 73 is likewise locked to shaft 74, leaving cam 72 free to turn. The arm 64 is then set to the desired value of $n$ on the scale on cam 68 and clamped in this position by means of the clamping screw 66. The movement of the pen 43 and hence of the cable 81, now turns shaft 74 through pulley 78 and shaft 58 is only turned through the cam gear formed by cams 69 and 73. The ratio of this cam gear is such that it transforms log log $\cot^2 \alpha$ into the corresponding function log ($\cot^2 \alpha + \tan^2 \alpha - 2$) − log 2. Different values of $n$ are taken care of by displacement of the log log cam 62 with respect to cam 69 of the above referred to cam gear. The scale shows different values of $n$ over the range through which $n$ varies with the usual run of samples measured. Since the cam gear 56 and 62 transforms the motion of the sleeve 57 into a motion which is proportional to the log log $\cot^2$ of the angle through which the prism 16 is turned. Any linear displacement in the shaft which rotates in proportion to a log log function will result in multiplying the exponent by the factor of displacement inasmuch as $n$ appears in the exponent of $b$ in the form of $-1/n$; the scale on cam 68 is an inverse scale which equals $-\log n$. The scale is shown for values of $n$ between ½ and 2 as this is the practical range through which $n$ needs to be varied. The scale is of course a simple logarithmic one, the distance between point 5 and 1 being the same as between 1 and 2.

If for any purpose it is desired to plot optical density in a generalized form $\log b^{-1/n}$, cam 73 is unlocked and cam 72 is locked, which introduces the cam gear formed by cams 68 and 72 into the train instead of the cam gear formed by cams 69 and 73, the cam gear formed by 56 and 62 remaining in the train. The ratio variation of the cam gear 68 and 72 is such that when set for $n=1$ the pen 43 will plot $\log \cot^2 \alpha$. $n$ has to be set for 1 as otherwise the cams would plot a different exponent than the square, because as pointed out above, the displacement in a part of the system which moves in accordance with a log log function results in multiplying the exponent by the displacement of $n$. The physical position of the arm 64 when $n$ equals 1 is determined by the contours of cams 68 and 72, because any pair of cams can be used the profiles of which when operating on each other will give the necessary transformation and the shape of the cam gear 68 will determine which part of it in contact with 72 corresponds to the 100% or 45° setting of 16. While the physical position of the scale for $n$ on cam 68 will depend to some extent on the shape of this cam and its mounting on the shaft, the shape of the scale will always be the same, that is to say, a logarithmic scale with the center corresponding to $n=1$. The length of the scale is purely dependent on the length of the arm 64 as it measures the amount of arc through which this arm is turned.

The type of drive using cam gears presents a number of advantages. It is simple and flexible, permitting easy shifting from one variable ratio drive to another and there is practically no wear because the cams are in pure rolling contact. They can, therefore, be molded from suitable plastic material and the time consuming operation of accurately cutting cams in hard metal is eliminated. Cam gears, therefore, constitute the preferred modification of my invention, but it should be understood that the invention is not broadly limited thereto.

It will be noted that the drive of Fig. 2 may be divided into two portions, one linear drive from shaft 47 to pen 43 and a portion having a varying ratio, the single cam 46 and follower 49. Two forms of drive of varying ratio and linear drive have been shown, namely, a cam and follower in Fig. 2 and cam gears in Fig. 9 and a worm, screw and nut in Fig. 2 and cable and pulleys in Fig. 11. The particular association of one type of linear drive with the particular type of drive of varying ratio has nothing to do with the principle of the invention in its broader scope. On the contrary, any type of linear drive may be used with any type of drive of varying ratio.

Although this presentation has been in terms of the application of coloring materials by coloring processes, it is contemplated to use the invention in other fields, such as the control of processes of manufacture of coloring materials and the standardization of their products. It is furthermore contemplated to use the invention for the prediction and analysis of spectrophotometric measurements, even those having no reference to color or even outside the visual range, for instance, in chemical analysis and medical diagnosis.

What I claim is:

1. In a recording spectrophotometer of the flickering beam type for measuring the reflectance of a colored sample, in which a photometering element is moved to control the relative intensities of the beams and thereby to compensate for the reflectance of the colored sample and in which a recording device is actuated to move a recording surface in accordance with wavelength or frequency of monochromatic light being introduced into the spectrophotometer, the improvement which comprises a drive linkage between the photometering element and the recording means operating on the recording surface, said linkage including a drive of varying ratio, the ratio of variation of said drive being such that the value recorded is substantially proportional to log $$\frac{(1-b^{1/n})^2}{2b^{1/n}}$$

where $b$ is the body reflectance of the sample at any given wavelength and $n$ is a parameter defining the departure of the sample medium from ideal diffusing characteristics.

2. In a recording spectrophotometer of the polarization flickering beam type for measuring the reflectance of a colored sample in which a photometering element is rotated through an angle $\alpha$ to control the relative intensities of the beams and thereby to compensate for the reflectance of the colored sample and in which a recording device is actuated to move a recording surface in accordance with wavelength or frequency of monochromatic light being introduced into the spectrophotometer, the improvement which comprises a drive linkage between the photometering element and the recording means operating on the recording surface, said linkage including a drive of varying ratio, the ratio of variation of said drive being such that the value recorded is substantially proportional to $\log (\cot^{2n}\alpha + \tan^{2n}\alpha - 2) - \log 2$ where $n$ is a parameter defining the departure of the sample medium from ideal diffusing characteristics.

3. In a recording spectrophotometer of the flickering beam type for measuring the reflectance of a colored sample, in which a photometering element is moved to control the relative intensities of the beams and thereby to compensate for the reflectance of the colored sample and in which a recording device is actuated to move a recording surface in accordance with wavelength or frequency of monochromatic light being introduced into the spectrophotometer, the improvement which comprises a drive linkage between the photometering element and the recording means operating on the recording surface, said linkage including a drive of fixed varying ratio, the ratio of variation of said drive being such that the value recorded is substantially proportional to log $$\frac{(1-b)^2}{2b}$$

where $b$ is body reflectance of the sample at any given wavelength.

4. In a recording spectrophotometer of the polarization flickering beam type for measuring the reflectance of a colored sample in which a photometering element is rotated through an angle $\alpha$ to control the relative intensities of the beams and thereby to compensate for the reflectance of the colored sample and in which a recording device is actuated to move a recording surface in accordance with wavelength or frequency of monochromatic light being introduced into the spectrophotometer, the improvement which comprises a drive linkage between the photometering element and the recording means operating on the recording surface, said linkage including a drive of fixed varying ratio, the ratio of variation of said drive being such that the value recorded is substantially proportional to $\log (\cot^2 \alpha + \tan^2 \alpha - 2) - \log 2$.

5. A recording spectrophotometer according to claim 1 in which the drive of varying ratio is divided into two portions and means for relative adjustment of the two portions in accordance with $n$ is provided.

6. A recording spectrophotometer according to claim 2 in which the drive of varying ratio is divided into two portions and means for relative adjustment of the two portions in accordance with $n$ is provided.

7. A spectrophotometer according to claim 3 in which the drive of varying ratio is a cam.

8. A spectrophotometer according to claim 4 in which the drive of varying ratio is a cam.

ORRIN WESTON PINEO.

Certificate of Correction

Patent No. 2,218,357.  —  October 15, 1940.

ORRIN WESTON PINEO

It is hereby certified that errors appear in the printed specification of the above numbered patent requiring correction as follows: Page 2, second column, line 40, for that portion of the equation reading "$l^{n-1}e-l/L$" read $l^{n-1}e^{-l/L}$; page 4, second column, line 4, for the word "into" read *onto*; line 56, for "to to" read *to*; page 8, first column, line 10, for "log $b^{-1/n}$" read *log $b^{-1/n}$*; and second column, line 46, claim 2, for $(\cot^{2n}\alpha+\tan^{2n}\alpha-2)$ read *$(\cot^{2/n}\alpha+\tan^{2/n}\alpha-2)$*; and that the said Letters Patent should be read with these corrections therein that the same may conform to the record of the case in the Patent Office.

Signed and sealed this 12th day of November, A. D. 1940.

[SEAL]

HENRY VAN ARSDALE,
*Acting Commissioner of Patents.*